US011443331B2

(12) United States Patent
Dance et al.

(10) Patent No.: US 11,443,331 B2
(45) Date of Patent: Sep. 13, 2022

(54) MULTI-TARGET TRACKING FOR DEMAND MANAGEMENT

(71) Applicant: Conduent Business Services, LLC, Dallas, TX (US)

(72) Inventors: Christopher R. Dance, Grenoble (FR); Roberto Ramon Rodriguez, Grenoble (FR)

(73) Assignee: Conduent Business Solutions, LLC, Dallas, TX (US)

( * ) Notice: Subject to any disclaimer, the term of this patent is extended or adjusted under 35 U.S.C. 154(b) by 263 days.

(21) Appl. No.: 14/179,970

(22) Filed: Feb. 13, 2014

(65) Prior Publication Data

US 2015/0227952 A1    Aug. 13, 2015

(51) Int. Cl.
*G06Q 30/02* (2012.01)
*G06Q 10/04* (2012.01)

(52) U.S. Cl.
CPC ......... *G06Q 30/0202* (2013.01); *G06Q 10/04* (2013.01)

(58) Field of Classification Search
CPC .......... G07B 15/02; G08G 1/14; G08G 1/142; G08G 1/148; G06Q 50/30
See application file for complete search history.

(56) References Cited

U.S. PATENT DOCUMENTS

| 2003/0210139 A1* | 11/2003 | Brooks | G06Q 50/30 340/541 |
| 2005/0091176 A1* | 4/2005 | Nishiuma | G06Q 10/04 706/45 |
| 2006/0018516 A1* | 1/2006 | Masoud | G06T 7/254 382/115 |
| 2007/0050240 A1* | 3/2007 | Belani | G08G 1/14 705/13 |

(Continued)

FOREIGN PATENT DOCUMENTS

| EP | 2 648 141 A1 | 10/2013 | |
| FR | 3004841 A1 * | 10/2014 | G08G 1/147 |

OTHER PUBLICATIONS

Sofia S. Villar, Restless Bandit Index Policies for Dynamic Sensor Scheduling Optimization, Apr. 2012, Ph.D. Thesis, Univeridad Carlos Ill de Madrid, pp. 1-59.*

(Continued)

*Primary Examiner* — Jerry O'Connor
*Assistant Examiner* — Matthew H Divelbiss
(74) *Attorney, Agent, or Firm* — Fay Sharpe LLP (57) ABSTRACT

In a method for monitoring a tracked parameter for a set of targets, a first methodology is applied during a current time interval to acquire observations of the tracked parameter for a selected sub-set of the set of targets. A second methodology is applied during the current time interval to acquire observations of the tracked parameter for at least those targets that are not in the selected sub-set of the set of targets.

(Continued)

A variance forecast is generated for an upcoming time interval for each target based on a current variance for the target and on either observations acquired using the first methodology or using the second methodology. The selected sub-set of the set of targets is updated for the upcoming time interval to maximize an aggregation of variance forecasts over the updated selected sub-set of the set of targets.

14 Claims, 4 Drawing Sheets

(56) References Cited

U.S. PATENT DOCUMENTS

| | | | | |
|---|---|---|---|---|
| 2011/0276370 | A1* | 11/2011 | Agrait | G08G 1/14 |
| | | | | 705/13 |
| 2013/0258107 | A1 | 10/2013 | Delibaltov | |
| 2014/0036077 | A1* | 2/2014 | Nerayoff | G06T 7/70 |
| | | | | 348/148 |
| 2014/0149153 | A1* | 5/2014 | Cassandras | G08G 1/144 |
| | | | | 705/5 |

OTHER PUBLICATIONS

Eric Hsiao-Kuang Wu et al. Agile Urban Parking Recommendation Service for Intelligent Vehicular Guiding System, Apr. 1, 2014, IEEE Intelligent Transportation Systems Magazine (vol. 6, Issue: 1, pp. 35-49) (Year: 2014).*

Fisher et al; "An Analysis of Approximations for Maximizing Submodular Set Functions", Mathematical Programming Study, 8 (1978), pp. 73-87.

Thiele; "Erreurs Quasi-Systematiques", La Methode Des Moindres Carres, C.A. Reitzel, Libraire-Edituer, (1880) pp. 1-29.

Whittle; "Restless Bandits: Activity Allocation In a Changing World", Applied Probability Trust, 1988, pp. 287-298.

Goundan et al.; "Revisiting the Greedy Approach to Submodular Function Maximization", Optimization online, pp. 1-25, 2007.

Weber et al.; "On an Index Policy for Restless Bandits", Journal of Applied Probability, pp. 637-648, 1990.

Bulan et al.; "Video-Based Real-Time On-Street Parking Occupancy Detection System" Journal of Electronic Imaging, 22(4):041109-1-041109-15, 2013.

Villar; "Restless Bandit Index Policies for Dynamic Sensor Scheduling Optimization", PhD thesis, Statistics Department, Universidad Carlos Ill de Madrid, Apr. 2012.

* cited by examiner

MULTI-TARGET TRACKING FOR DEMAND MANAGEMENT

BACKGROUND

The following relates to the data acquisition and tracking arts, demand management arts, and related arts, as well as to applications of same such as vehicle parking resource management, opinion tracking, and so forth.

Tracking problems entail monitoring a tracked parameter, typically for the purpose of predicting trends in the tracked parameter that can be used for purposes such as resource management (when tracking usage of a resource), opinion polling (when tracking opinions on a topic of interest), policy decisions, or so forth. Values of the tracked parameter are observed over time, and these observations are analyzed by modeling, data fitting, or the like to elicit trends or other predictive information. By way of illustrative example, usage of a parking resource may be tracked by monitoring the occupancy fraction (i.e. the fraction of occupied parking spots to the total number of available parking spots). As another illustrative example, in opinion polling prior to an election, a tracked parameter may be the fraction of voters favoring a particular candidate.

Tracking may be performed for various target categories, such as tracking occupancy of surface lot spots, on-street parking spots, enclosed garage parking spots, or so forth, or of different geographical regions (downtown, in the suburbs, east side, west side, or so forth). Similarly, in election polling it may be of interest to know candidate favorability for different demographic groups, different geographical regions, or so forth.

Tracking data comprise observations. For example, parking occupancy observations may be generated from sales of parking tickets and/or their subsequent redemption when vehicles exit the parking facility. Alternatively, parking occupancy may be directly observed, for example using in-ground sensors, cameras, or another direct-measurement sensor. Opinion observations may be acquired indirectly, for example by performing data mining on social media websites, or may be acquired directly via surveys that directly ask voters about candidate favorability.

Direct measurement of the tracked parameter is generally more reliable as compared with more indirect or inferential tracking data. On the other hand, direct tracking can be expensive in terms of resources expended to collect the data, as compared with more indirect or inferential tracking methods. Said another way, direct tracking data typically produces lower yield for a given expenditure of resources as compared with indirect tracking. For example, it is expensive to install and continually monitor occupancy sensors for each parking spot; by contrast, occupancy information can be inferred based on already-available parking ticket sale and redemption data. Similarly, data mining of social media sites can be performed automatically by web crawlers or the like; whereas, acquiring candidate favorability information directly requires more expensive direct-mailing and/or personal solicitation efforts.

The cost of direct tracking can be reduced through the use of sampling of the target population. For example, an opinion survey typically is performed for a small sample of the electorate, and the survey results are extrapolated to the entire electorate, with some estimated statistical margin of error. However, the reliability of sampled tracking data is reduced as compared with exhaustive tracking of all targets. In the area of parking occupancy monitoring, it is known to employ video-based parking occupancy sensors, which can be configured as mobile units. See Bulan et al., "Video-based real-time on-street parking occupancy detection system", Journal of Electronic Imaging vol. 22 no. 4 pages 041109-1 to 041109-1 (October-December 2013).

BRIEF DESCRIPTION

In some embodiments disclosed herein, a non-transitory storage medium stores instructions readable and executable by an electronic data processing device to perform a tracking method comprising iteratively repeating the set of operations: applying a first methodology (O) to acquire observations of a tracked parameter for a selected sub-set of a set of targets; applying a second methodology (P) different from the first methodology to acquire observations of the tracked parameter for at least those targets of the set of targets that are not in the selected sub-set of the set of targets; generating a variance forecast for each target of the set of targets using either a variance update function (g) operating on observations of the tracked parameter acquired using the first methodology (O) if the target is in the selected sub-set of the set of targets, or a variance update function (f) operating on observations of the tracked parameter acquired using the second methodology (P) if the target is not in the selected sub-set of the set of targets; and updating the selected sub-set of the set of targets to maximize an aggregation of variance forecasts over the updated selected sub-set of the set of targets.

In some embodiments disclosed herein, a tracking method is disclosed for monitoring a tracked parameter for a set of targets. The tracking method comprises: applying a first methodology during a current time interval to acquire observations of the tracked parameter for a selected sub-set of the set of targets; applying a second methodology different from the first methodology during the current time interval to acquire observations of the tracked parameter for at least those targets that are not in the selected sub-set of the set of targets; generating a variance forecast for an upcoming time interval for each target using a computer configured to compute either a variance update function operating on a current variance for the target and on observations acquired for the target in the current time interval using the first methodology if the target is in the selected sub-set of the set of targets, or a variance update function operating on the current variance for the target and on observations acquired for the target in the current time interval using the second methodology if the target is not in the selected sub-set of the set of targets; and using the computer, updating the selected sub-set of the set of targets for the upcoming time interval to maximize an aggregation of variance forecasts over the updated selected sub-set of the set of targets.

In some embodiments disclosed herein, a system is disclosed for monitoring a tracked parameter for a set of spatially distributed targets. The system comprises: a first observation system comprising a set of mobile observing units arranged to acquire observations of the tracked parameter for a selected sub-set of the set of spatially distributed targets; a second observation system configured to acquire observations of the tracked parameter without using the set of mobile observing units for at least those targets of the set of spatially distributed targets that are not in the selected sub-set of the set of spatially distributed targets; and a computer. The computer is configured to generate a variance forecast for each target of the set of spatially distributed targets by computing: for targets belonging to the selected sub-set of the set of spatially distributed targets, a variance update function operating on a current variance for the target and on observations acquired for the target using the first observation system, and for targets of the set of spatially distributed targets that do not belong to the selected sub-set of the set of spatially distributed targets, a variance update function operating on the current variance for the target and on observations acquired for the target using the second observation system. The computer is further configured to update the selected sub-set of the set of spatially distributed targets to maximize an aggregation of variance forecasts over the updated selected sub-set of the set of spatially distributed targets.

DETAILED DESCRIPTION

One approach for acquiring high value observations of a tracked parameter for a set of targets is to employ a set of observing units. If the observing units are costly, then it may be the case that the number of observing units is less (sometimes substantially less) than the number of targets to be observed. In such cases, the observing units are allocated to targets. It is advantageous to make this allocation in a manner that effectively utilizes the limited resource represented by the set of observing units.

If all tracking observations are generated by the set of observing units, then the observing units are suitably rotated amongst the targets so as to cover all targets over a certain time interval (e.g., a "round robin" approach). If the targets are not all considered to be of equal value, such a rotation may be adjusted to expend more resources observing the higher value targets as compared with lower value targets.

Such approaches assume that there is only the one tracking methodology which uses the observing units. If, however, a second, less expensive methodology is available for acquiring tracking data, then it is recognized herein that the allocation of the observing units can further take into account tracking data provided by this second methodology in order to better utilize the observing units.

Another consideration is whether the observing units can observe more than one target. For example, in the case of tracking parking occupancy in which each target is a parking space segment, a video-based parking occupancy sensor may be capable of being arranged to observe more than one parking space segment at the same time (or effectively at the same time, e.g. by rotating the camera between different angles viewing different parking space segments at a rate fast enough to capture parking space occupancy effectively in real-time).

As disclosed herein, optimization of the allocation of observing units in such circumstances advantageously maximizes an aggregation of variance forecasts over the allocation of observing units, where the variance forecasts are generated both based on observing data acquired by the first methodology which uses the observing units and also based on observing data acquired using a second methodology that does not use the observing units. The aggregation of variance forecasts can take various forms: in some embodiments, the aggregation is an aggregation over Whittle indices. See Whittle, "Restless Bandits: Activity Allocation in a Changing World", Journal of Applied Probability vol. 25 pages 287-298 (1988). Whittle indices are designed to pay a decision-maker a subsidy each time they operate a project i in return for not operating project i at time t—the subsidy which makes it equally attractive to operate or not operate project i at time t is known as the Whittle index. However, another index that depends on the variance forecast for a target over an upcoming time interval can be used.

For applications in which the observing units can observe groups of targets, the disclosed approach can be modified to maximize the allocation of the observing units over a set of target collections, where each target collection comprises a sub-set of targets that are observable by a single observing unit. In one approach, the targets of the set of targets are grouped into a set of target collections $\mathcal{C}$, where each the targets of each target collection is observable by a single observing unit. The sub-set of the set of targets selected for observation by a set of observing units $\mathcal{M}$ at a time t is chosen to optimize an objective $\max_{\mathcal{M} \to \mathcal{C}} \Sigma_{s \in \mathcal{A}_t} W_{s,t}$ where $\mathcal{M} \to \mathcal{C}$ denotes an allocation of the observing units of the set of mobile observing units $\mathcal{M}$ to collections of the set of target collections $\mathcal{C}$, $\mathcal{A}_t$ denotes the sub-set of the set of spatially distributed targets that are observable by the allocation $\mathcal{M} \to \mathcal{C}$, and $W_{s,t}$ denotes an index, such as a Whittle index, that depends on the variance forecast for target s over an upcoming time interval. It should be noted that the target collections may overlap, e.g. a given target s may belong to two or more target collections of the set of target collections $\mathcal{C}$.

By way of illustrative example, a parking occupancy tracking task is described. However, the disclosed tracking techniques can be applied to other tracking tasks in which a set of targets is observed by a set of observing units that is smaller than the set of targets (so that the observing units are advantageously and optimally allocated to targets), and are also observed by a second methodology that does not rely upon the observing units. For the task of tracking parking occupancy, the tracked parameter is suitably a parking occupancy metric. As used herein, the "capacity" of a parking space segment is equal to the number of parking spaces (i.e. parking stalls) included in the parking space segment. The occupancy fraction is suitably used as the tracked parameter, and is defined for a parking space segment as the ratio of the number of occupied stalls to the capacity.

In the illustrative example, two tracking data acquisition methodologies are employed. The first employs mobile tracking units such as video cameras. See, e.g. Bulan et al., Video-based real-time on-street parking occupancy detection system", Journal of Electronic Imaging vol. 22 no. 4 pages 041109-1 to 041109-15 (2013). While the mobile tracking unit can typically determine the parking occupancy in near real-time, in some embodiments it is useful to employ a time-average occupancy fraction as observed by a mobile unit over a specific segment (e.g. 9 AM-11 AM Mon.-Fri.) of a specific week on a specific block face.

The second methodology utilizes payment information, for example computing the occupancy fraction for a parking space segment at a given time as the ratio of the number of paid stalls to the capacity (suitable for "all day" parking), or as the difference between tickets sold and tickets redeemed.

As with the direct observation methodology, it may be useful to employ a suitable time-average, e.g. the time-average payment fraction of a specific segment of a specific week on a specific block face. It will be appreciated that payment tracking data is, in general, of lower value than the directly observed tracking data generated by the mobile observing units. For example, some parking spaces may be occupied but the driver failed to pay for parking, or the driver may have used a parking voucher that is not correctly accounted for in the tracking, or so forth. On the other hand, the payment tracking data is typically cheaper than the direct observation data since it is acquired automatically as part of the payment collection system.

In the illustrative embodiment, the objective is to minimize a discounted sum of weighted squared errors in forecasts of future occupancy, minus setup costs. The sum is suitably over weeks (e.g. 9 AM-11 AM Mon.-Fri. or another time unit) and over block faces or other parking space segments. The weights are chosen to reflect the importance of accurate forecasts for the applications in question (for example, parking space segments with more parking spaces may be deemed more important than smaller parking space segments, and/or parking space segments in prime areas having higher parking fees may be more important than outlying parking space segments with lower parking fees, or so forth). The setup cost may vary with the parking space segment, and is incurred each time a mobile observing unit (e.g. mobile parking camera) is positioned on a block face, at a street intersection, or so forth. The setup cost may include (by way of illustrative example) observing unit transportation costs, calibration costs of identifying the region of interest of each parking stall in the images, and so forth. In general, each parking space segment is treated as a target, and a given mobile observing unit may observe two or more parking space segments.

In the illustrative example, the following notation is employed. The set of targets (e.g. parking space segments in this example) is denoted as the set of targets $\mathcal{S}$. The set of mobile observing units is denoted $\mathcal{M}$. A set of times (or time intervals) is denoted $\mathcal{T}$. A set of target collections $\mathcal{C} := \{S_1, S_2, \ldots, S_n\}$ is defined, where each target collection is a defined sub-set of the set of targets $\mathcal{S}$ that can be observed by a single mobile observing unit. At time $t \in T$, sensor $m \in \mathcal{M}$ observes one target collection, denoted by $\mathcal{C}_{m,t} \in \mathcal{C}$. The sub-set of the set of targets $\mathcal{S}$ that is observed by some allocation of the mobile observing units to target collections at time t is denoted $\mathcal{A}_t := \cup_{m \in \mathcal{M}} \mathcal{C}_{m,t}$. Each target $s \in \mathcal{S}$ has a weight $w_s \in \mathbb{R}_+$ and a setup cost $h_s \in \mathbb{R}_+$. A pair of variance-update functions $f_s : \mathbb{R}_+ \to \mathbb{R}_+$, $g_s : \mathbb{R}_+ \to \mathbb{R}_+$ are defined, with the interpretation that the variance $V_{s,t} \in \mathbb{R}_+$ of target s at time t updates as:

$$V_{s,t+1} = \begin{cases} f_s(V_{s,t}) & \text{if } s \notin \mathcal{A}_t \\ g_s(V_{s,t}) & \text{if } s \in \mathcal{A}_t \end{cases} \quad (1)$$

which can be combined using the notation:

$$V_{s,t+1} =: \varphi_{\mathcal{A}_t}(V_{s,t}) \quad (2)$$

In Equation (1), the notation $s \notin \mathcal{A}_t$ indicates that the target s is not observed by any mobile observing unit at time t, and the notation $s \in \mathcal{A}_t$ indicates that the target s is observed by some mobile observing unit at time t. The objective is to select an allocation of the mobile observing units to subsets of targets (and more particularly to target collections) that minimizes the discounted sum of the setup costs and weighted variance for discount factor $\beta \in (0,1)$ or the limit of this expression as $\beta \to 1$:

$$\min_{C_{...}: \mathcal{M} \times \mathcal{T} \to C} \left\{ \sum_{t \in T} \beta^t \left( \sum_{s \in \mathcal{A}_t} h_s + \sum_{s \in S} w_s V_{s,t} \right) : V_{s,t} = \phi_{\mathcal{A}_t}(V_{s,t-1}) \right\} \quad (3)$$

Figure 1:
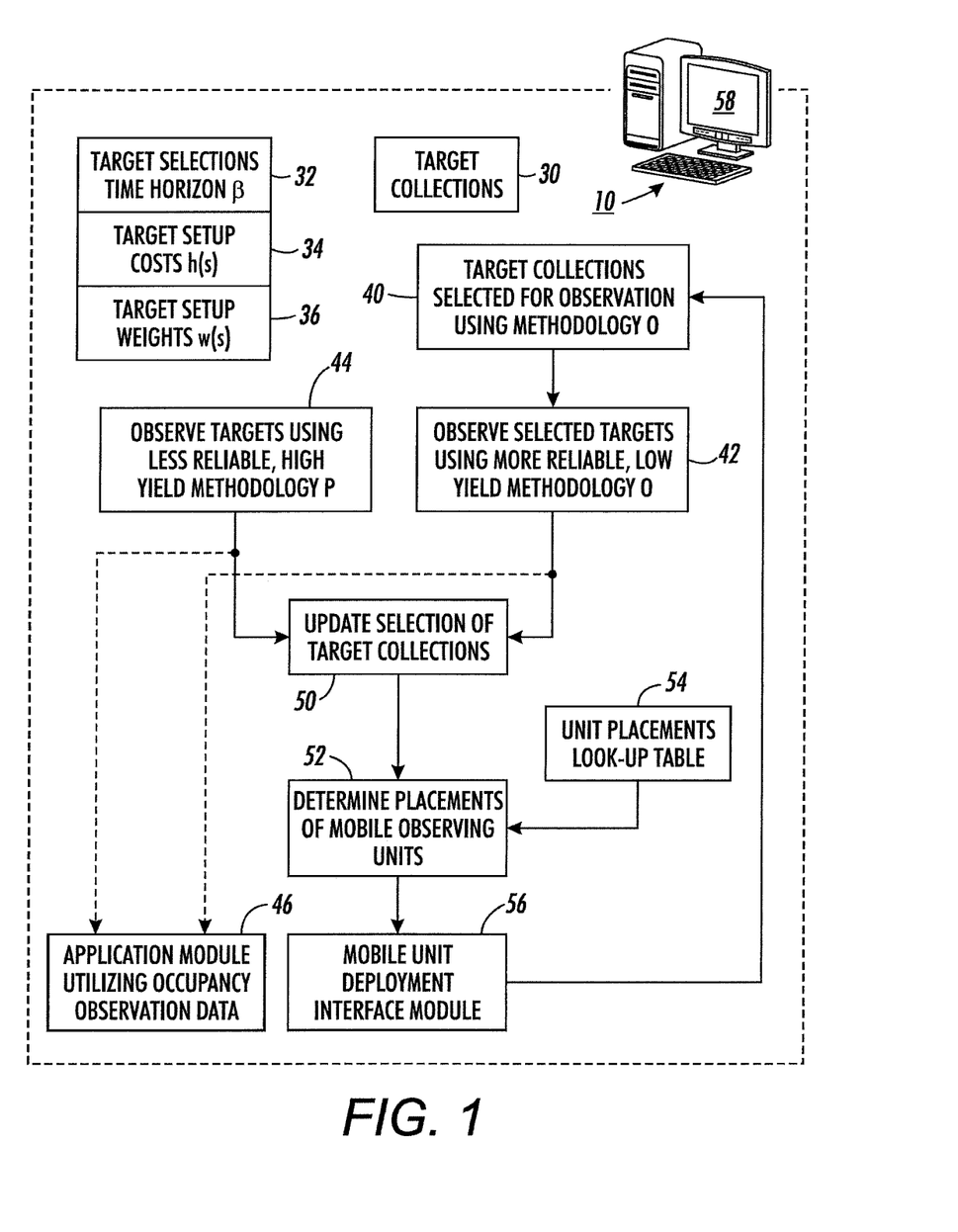
FIG. 1 diagrammatically shows a tracking system.
Figure 2:
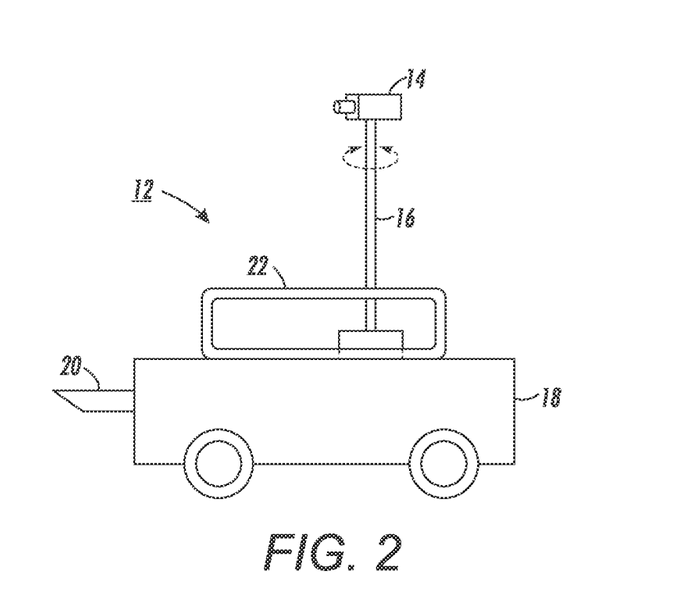
FIGS. 2 and 3 diagrammatically show side and top views, respectively, of an illustrative mobile observing unit employing a video camera.
Figure 3:
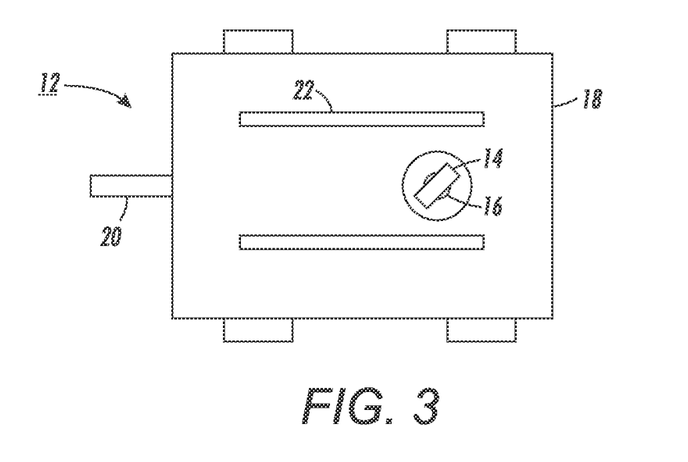

With reference to FIGS. 1-3, the illustrative tracking system includes a computer 10 (FIG. 1) that is programmed by software or other executable instructions to perform the computational operations as disclosed herein, and a set of mobile observing units, an illustrative mobile observing unit 12 being shown in FIGS. 2 and 3 in side and top views, respectively. The mobile observing unit 12 includes a camera 14 mounted in an elevated position, e.g. on a post 16, and arranged to rotate (preferably over a full 360°, although less than full rotation is contemplated). The mobile observing unit 12 further includes a wheeled base 18, which in some embodiments is configured as a trailer that may be hitched to a truck via a hitch 20, although other transport arrangements such as flatbedding are also contemplated. The base may include other features, such as handrails 22, as may be convenient. The mobile observing unit 12 further includes or is operatively connected with an electronic data processing device (which in some embodiments may comprise the computer 10, while in other embodiments may be an on-board computer or digital processor, not shown, disposed in or on the base 18) that controls the camera 14 to acquire video of a target (e.g. a parking space segment) and process the video to determine occupancy of parking spaces of the parking space segment on a near real-time basis. Some suitable video processing procedures are described, for example, in Bulan et al., "Video-based real-time on-street parking occupancy detection system", Journal of Electronic Imaging vol. 22 no. 4 pages 041109-1 to 041109-1 (October-December 2013).

Figure 4:
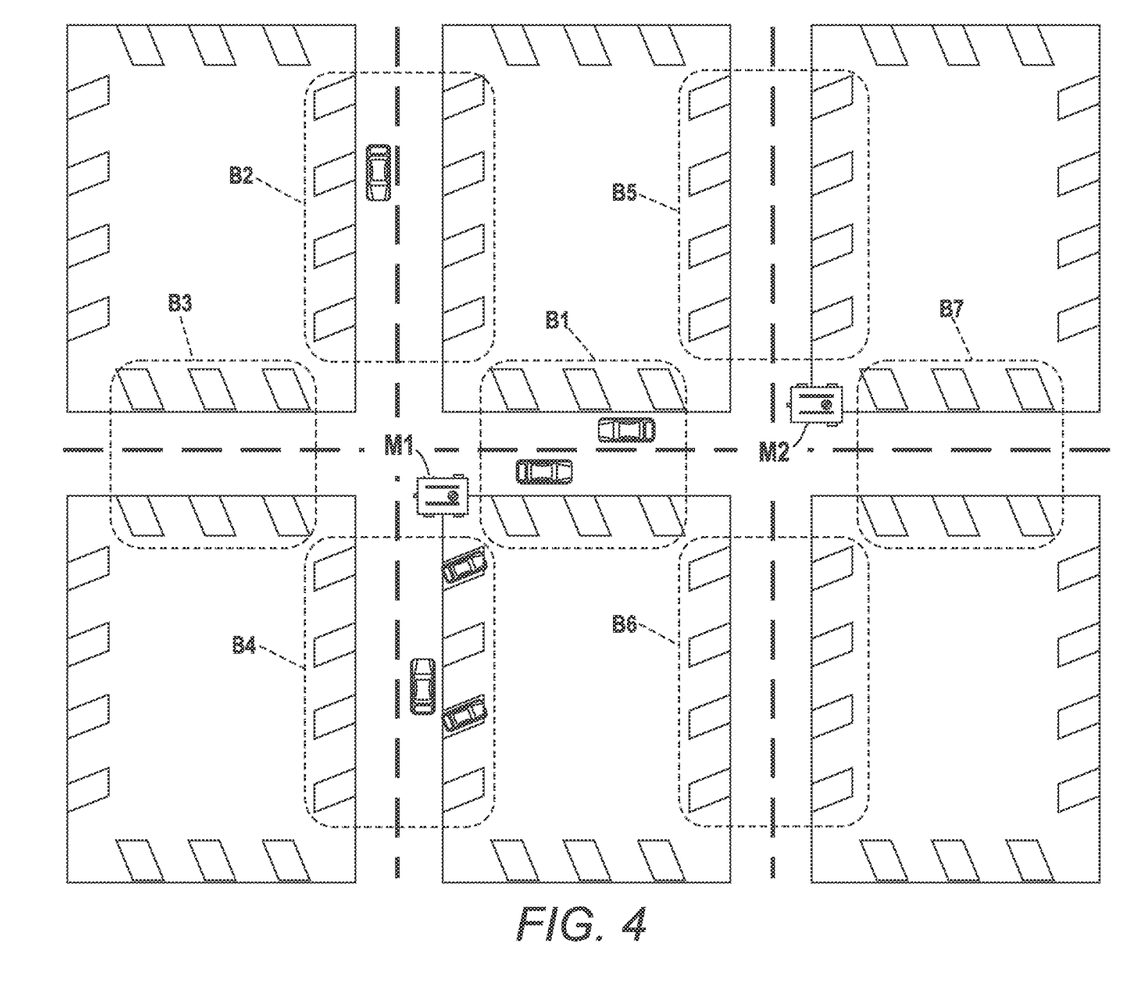
FIG. 4 diagrammatically shows placement of two mobile observing units to observe collections of parking space segments in the form of block faces in on-street parking.

With further reference to FIG. 4, the set $\mathcal{M}$ of mobile observing units (of which the unit 12 of FIGS. 2 and 3 is an illustrative example) are allocated to target collections of the set of target collections $\mathcal{C}$. FIG. 4 shows an overhead view of the allocation of two such mobile observing units, denoted in FIG. 4 as mobile observing units M1 and M2, respectively, at road intersections so as to observe a collection of parking space segments B1, B2, B3, B4, B5, B6, B7, which in this illustrative example are on-street parking block faces. As seen in FIG. 4, the mobile observing unit M1 is positioned to observe four block faces: B1, B2, B3, B4, in near real-time. By "near" real-time, it is meant that the camera 14 (see FIGS. 2 and 3) of the mobile observing unit M1 can rotate between different viewing angles so as to view each of the four block faces: B1, B2, B3, B4 in relatively rapid succession. A parking space is typically occupied by a vehicle for at least several minutes and so essentially (i.e. near) real-time monitoring of all parking spaces of the four block faces: B1, B2, B3, B4 is achieved if the camera 14 can rotate to view each block face in turn over a cycle of a few tens of seconds to a few minutes. (In an alternative embodiment, not shown, the mobile observing unit M1 may include multiple non-rotating cameras that simultaneously view different parking space segments. In another alternative embodiment, a single non-rotating wide-angle camera is provided which simultaneously views multiple block faces.) The video is processed, e.g. by segmenting to process each parking space and using pattern matching, matched filtering, feature identification, or another suitable technique to identify whether the parking space is occupied or empty. In some embodiments the mobile observing unit M1 is calibrated as part of the set-up, for example by having a human operator identify the camera angle centered on each parking space, and/or optionally manually segmenting the video field-of-view.

Figure 5:
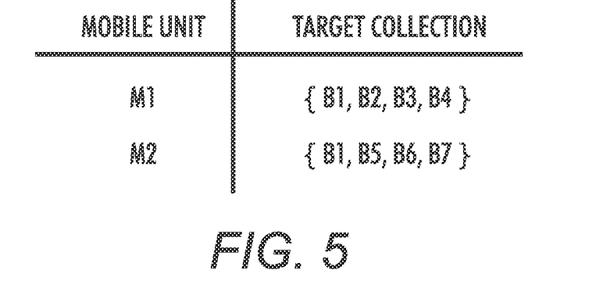
FIG. 5 shows a table of the target block faces observable by each of the mobile units placed as shown in FIG. 4.
Figure 6:
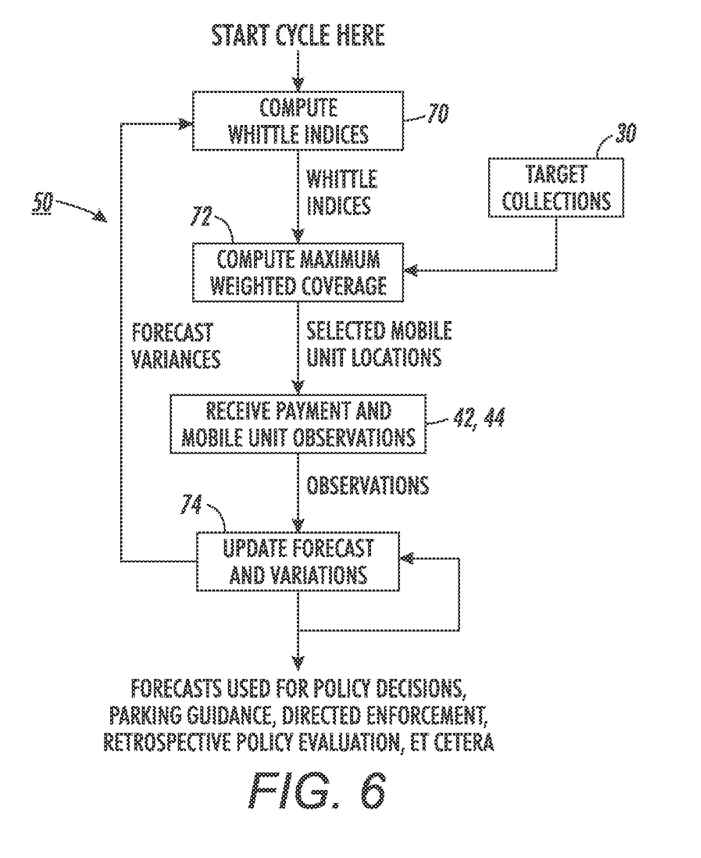
FIG. 6 diagrammatically shows the operation updating the selection of target collections to be observed by a set of mobile observing units.

With continuing reference to FIG. 4 and with further reference to FIG. 5, in similar fashion, the mobile observing unit M2 of FIG. 4 can rotate to different viewing angles so as to observe the four block faces: B1, B5, B6, B7 in near real-time. As tabulated in FIG. 5, this geographic arrangement is suitably captured by defining two target collections: a target collection {B1, B2, B3, B4} to which mobile observing unit M1 is allocated; and a target collection {B1, B5, B6, B7} to which mobile observing unit M2 is allocated. It will be noted that the parking space segment B1 belongs to both target collections.

With reference back to FIG. 1, the set of target collections $\mathcal{C}$ is denoted diagrammatically as element 30. This data is an input to the computer 10, and may for example be generated by a one-time survey of the parking space segments to determine suitable mobile observing unit placements such as those depicted in FIG. 4 and identifying the parking space segments that can be observed from each such placement. (This information may be updated as appropriate based on follow-up surveys, updating to indicate closure or opening of parking space segments, et cetera). The computer 10 also receives as inputs a target selection time horizon (or discount factor) β denoted as block 32 in FIG. 1, which provides an appropriate discounting (or cut-off in some embodiments) of temporally old tracking data in making variance forecasts. Further inputs include the target setup cost $h_s$ and target value weights $w_s$, which are denoted as blocks 34 and 36, respectively. These are also suitably generated based on the one-time survey and/or based on other information. In some embodiments the target setup cost $h_s$ is the same for all parking space segments, and in some embodiments the target value weights $w_s$ are the same for all parking space segments. Alternatively, the target setup costs $h_s$ can be selected to reflect greater or lesser difficulty in setting up a mobile observing unit to observe the parking space segment s. In similar fashion, in some embodiments the target value weights $w_s$ may be set to reflect the relative value of each parking space segment, e.g. by setting $w_s$=P×N where P is the fraction of parking occupancy that is paid for (per parking space in the parking space segment) and N is the number of parking spaces in the segment. Alternatively, the weight may be an increasing function of an a priori estimate of the proximity of the tracked parameter to a policy decision threshold. For instance, in some cities, prices are decreased when occupancy fractions are less than 60% and increased when occupancy fractions exceed 80%, so that more accurate estimation is required for block faces whose occupancy fraction is in the vicinity of 40-70% than for block faces whose occupancy fraction is in the vicinity of 0-30%. Various other setup cost and/or weight normalization schemes may also be employed.

With continuing reference to FIG. 1, the computer 10 also receives a current set of target collections selected for observation by a first methodology (O), that is, by the mobile observing units. This set of target collections selected for observation by the first methodology (O) is denoted in FIG. 1 by block 40, and corresponds to (i.e. is defined by) the allocation of the mobile observing units of the set of mobile observing units $\mathcal{M}$ to target collections of the set of target collections $\mathcal{C}$. Although this allocation 40 is an initial input, subsequent processing performed by the computer 10 updates this allocation for successive time intervals as disclosed herein. During a current time interval, the tracked parameter (a parking occupancy metric such as occupancy fraction in the illustrative example) is observed by the first methodology (O) as indicated by block 42, using the mobile observing units allocated according to the allocation 40. It will be appreciated that this observation process 42 observes only the sub-set $\mathcal{A}_t$ of the total set of targets (parking space segments) $\mathcal{S}$. At the same time, the tracked parameter is observed by a second methodology (P) as indicated by block 44, using a methodology (P) that does not use the mobile observing units. For example, the observation process 44 may rely upon parking payment information. The observation process 44 may observe only the sub-set $\mathcal{S} \setminus \mathcal{A}_t$ of the total set of targets $\mathcal{S}$ that is not observed by observation process 40, or the observation process 44 may observe the total set of targets $\mathcal{S}$. Since payment information is typically available for all parking space segments regardless of whether they are being observed by the mobile observing units, it typically is advantageous to apply the observation process 44 to observe all parking space segments (thus producing "double data" for $\mathcal{A}_t$).

The processing performed by the computer 10 in executing observation processes 42, 44 can be various, depending upon how much processing is performed elsewhere. For example, in embodiments in which each mobile observing unit includes an on-board computer that processes the video to generate occupancy observations, the process 42 using methodology (O) may simply receive and store the occupancy observations received from the mobile observing units. Moreover, that data may be buffered at the mobile observing unit and offloaded to the computer 10 on an occasional basis, e.g. once a week. In other embodiments, it is contemplated for the raw video acquired by the camera 14 of the mobile observing unit to be transmitted to the computer 10, e.g. via the Internet, and for the process 42 to perform the video processing necessary to isolate image regions corresponding to individual parking spaces and to perform matched filtering or other image processing to ascertain whether each parking space is occupied or empty, followed by computing a suitable parking occupancy metric such as the occupancy fraction. Similarly, the observation process 44 using methodology (P) may be limited to receiving and storing occupancy data generated by a separate parking payment processing system, or the observation process 44 may receive raw data such as parking payment receipts and generate the occupancy data from the raw data.

The parking occupancy observation data generated by the observation process 42 using the first methodology (O) and generated by the observation process 44 using the second methodology (P) is suitably utilized by an application module 46, which may be implemented by the computer 10 or by another computer or electronic data processing device. For example, the occupancy observations may be used by the application module 46 to make policy decisions (e.g. set parking rates, decide whether to add or remove parking space segments, et cetera), to drive electronic road signage directing visitors to parking areas, to direct parking enforcement (e.g., parking space segments showing higher occupancy as measured by the mobile observing units as compared with the occupancy estimated by payment information are good candidates for increased ticketing for unpaid parking), and so forth.

Additionally, as disclosed herein the combination of the parking occupancy observation data provided by the first methodology (O) utilizing the mobile observing units and the occupancy observation data provided by the second methodology (P) (e.g. payment information) not utilizing the mobile observing units are leveraged in an operation 50 to update the selection 40 of target collections for observation by the mobile observing units in an upcoming time interval. The sub-set of the set of targets selected for observation by a set of observing units $\mathcal{M}$ at a time t is chosen to optimize an objective $\max_{\mathcal{M} \to \mathcal{C}} \Sigma_{s \in \mathcal{A}_t} W_{s,t}$ where $\mathcal{M} \to \mathcal{C}$ denotes the allocation of the mobile observing units to target collections, $\mathcal{A}_t$ denotes the sub-set of the set of spatially distributed targets that are observable by the allocation $\mathcal{M} \to \mathcal{C}$, and $W_{s,t}$ denotes an index, such as a Whittle index, that depends on the variance forecast for target s over an upcoming time interval (e.g. depends upon $V_{s,t+1}$ of Equations (1) and (2)). Given the optimized allocation, in an operation 52 the placements of the mobile observing units are determined. This can be done, for example, using a look-up table 54 listing the mobile observing unit placement (e.g. specified by GPS coordinates, street intersection, or other suitable geographical coordinates) for each target collection. The look-up table 54 is suitably generated as part of the survey performed to generate the target collections 30. The mobile observing unit placements are then conveyed to a human user by operation of a mobile unit deployment interface module 56, which may for example indicate the mobile observing unit placements as an overlay on an electronic map displayed on a display device 58 of the computer 10, and/or may list the mobile observing unit placements on the display device 58 using suitable GPS coordinates, street intersections, or other placement identifications. Human operators then undertake the task of transporting mobile observing units to the indicated placements so as to physically update the target collections selection 40, and the tracked parameter (parking occupancy) monitoring continues.

With reference to FIG. 5, an illustrative process suitably performed by the update operation 50 of FIG. 1 to update the selection 40 of target collections for observation by the mobile observing units in an upcoming time interval is described. Given values include the set of targets $\mathcal{S}$, the set of mobile observing units $\mathcal{M}$, a set of observation time intervals $\mathcal{T}$, the set of collections $\mathcal{C}$, the discount factor $\beta$, and data $\langle w_s, h_s, f_s, g_s \rangle_{s \in \mathcal{S}}$ for each target s including its assigned weight $w_s$, its assigned setup cost $h_s$, and its variance update functions $f_s, g_s$ (see Equations (1) and (2)). Given this information, the schedule at time t is generated as follows. In an operation 70, the Whittle index $W_{s,t}$ for each target s is generated. (More generally, an index that depends on the variance forecast for target s over an upcoming time interval is generated in the operation 70). In an operation 72, the maximum weighted coverage is computed. In one approach, letting $(C_{m,t}: m \in \mathcal{M})$ be an approximate solution to the weighted coverage problem yields:

$$\max_{C_{.,t}: \mathcal{M} \to \mathcal{C}} \Sigma W_{s,t} \quad (4)$$

In other words, the allocation $\mathcal{M} \to \mathcal{C}$ of mobile observing units to target collections is determined to maximize the sum of the Whittle indices (or other aggregation of indices that depend on the variance forecasts). Thereafter, the operations 42, 44 already described with reference to FIG. 1 are carried out to receive payment and mobile unit observations of the tracked parameter (parking occupancy, using a suitable parking occupancy metric such as occupancy fraction). In the operation 42, for each mobile unit $m \in \mathcal{M}$, targets $C_{m,t}$ are observed. In the operation 44, For (at least) each target $s \in \mathcal{S} \setminus \mathcal{A}_t$, occupancy observations are received based on parking payment observations. (The set $\mathcal{S} \setminus \mathcal{A}_t$ consists of all targets in $\mathcal{S}$ that are not in the sub-set $\mathcal{A}_t$ that is observed by the allocation $\mathcal{M} \to \mathcal{C}$ of mobile observing units to target collections. More generally, the operation 44 can observe additional targets belonging to the sub-set $\mathcal{A}_t$, and in some embodiments the operation 44 is applied to observe all targets in $\mathcal{S}$.) In an operation 74, the forecast variances $V_{s,t+1} = \varphi \mathcal{A}_t(V_{s,t})$ are updated, and processing returns to block 70 to re-compute the Whittle indices and (as per operation 72) the subset $\mathcal{A}_t$ for the next observation interval.

The operation 70 suitably computes the Whittle indices in accordance with the approach disclosed in Sofia S. Villar, *Restless bandit index policies for dynamic sensor scheduling optimization*, PhD thesis, Statistics Department, Universidad Carlos III de Madrid, April 2012. However, the Whittle index computation 70 is modified to account for both observations generated by methodology (O) using the mobile observation units (process 42) and observations generated by methodology (P) which does not use the mobile observation units (process 44). To simplify the notation, consider a target s and drop the index s from $V_{s,t}$, $w_s$, $h_s$, $f_s$, $g_s$, $W_{s,t}$. Given the current variance $V_t$, the mapping $\pi: \mathbb{R}_+ \to \mathbb{R}_+$ and its iterates are defined by:

$$\pi(x) := \begin{cases} f(x) & \text{if } x \leq V_t \\ g(x) & \text{otherwise} \end{cases} \quad (5)$$

and $$\pi^{(n)}(x) := \begin{cases} x & \text{if } n = 0 \\ \pi(\pi^{(n-1)}(x)) & \text{for } n = 1, 2, \ldots \end{cases}$$

along with the indicators $$\alpha^{(n)}(x) := 1_{\pi^{(n)}(x) > V_t}$$

for n=0, 1, 2, . . . . The Whittle index is then:

$$W_t := -h + w \frac{\sum_{n=0}^{\infty} \beta^n (\pi^{(n)}(f(V_t)) - \pi^{(n)}(g(V_t)))}{1 + \sum_{n=0}^{\infty} \beta^n (\alpha^{(n)}(g(V_t)) - \alpha^{(n)}(f(V_t)))} \quad (6)$$

To approximate, these sums may be truncated after a large number of terms e.g. after 1000 terms.

An embodiment of the operation 72 (solution to the maximum weighted coverage problem) is next described. Consider a time t and drop the index t from $C_{m,t}$, $W_{s,t}$. Operation 72 entails choosing some sets $G := \{C_m: C_m \in \mathcal{C}, m \in \mathcal{M}\}$ so as to maximize an aggregation of variance forecasts over the updated selected sub-set of the set of targets (constrained by the grouping of targets into target collections). Using a sum of the Whittle indices computed in operation 70 as the aggregation of variance forecasts, the sets $G := \{C_m: C_m \in \mathcal{C}, m \in \mathcal{M}\}$ are chosen to:

$$\text{maximize} \sum_{s \in \cup_{m \in \mathcal{M}} C_m} W_s \tag{7}$$

Provided that $W_s \geq 0$ for all $s \in S$ the greedy method for this problem is a $$\left(1 - \frac{1}{e}\right)-$$

approximation to an optimal solution and proceeds as follows: (1) Set $G_0 = \emptyset$; (2) For i=1, ..., $|\mathcal{M}|$, select an $S \in \mathcal{C}$ which maximizes $\Sigma_{s \in G_i \cup S} W_s$ and set $G_i = G_{i-1} \cup S$; and (3) Return $G = G_{|\mathcal{M}|}$.

In the case that there are k different types of mobile units which can view different numbers of block faces, this can be accommodated by providing different groups of subsets of targets $\mathcal{C}_1, \ldots, \mathcal{C}_k$ corresponding to sets of mobile units of different types $\mathcal{M}_1, \ldots, \mathcal{M}_k$. The problem is then a case of submodular maximization with a partition matroid constraint and a good approximation is the locally-greedy method (see Fisher et al, "An analysis of approximations for maximizing submodular set functions—II", in *Polyhedral combinatorics*, pages 73-87 (Springer 1978); Goundan et al., "Revisiting the greedy approach to submodular set function maximization", *Optimization online*, pages 1-25 (2007)). This method applies the greedy method to each type of mobile unit in sequence and the approximation guarantees do not depend on the exact order in which those types are considered.

While Whittle indices are used in the illustrative embodiment, another aggregation of variance forecasts may be maximized over the updated selected sub-set of the set of targets (constrained by the grouping of targets into target collections). In one approach, a modification of the scaled tracking error variance (STEV) is used. The STEV heuristic maintains the tracking error variance $V_{s,t}$ for each parking space segment. Given m observing units each able to observe one target, at each iteration the STEV heuristic chooses those targets with the largest weighted tracking error variances:

$$\max_S \left\{ \sum_{s \in S} w_s V_{s,t} : S \subseteq S, |S| = m \right\} \tag{8}$$

If the mobile units view subsets of targets (i.e. target collections) rather than individual targets, then Equation (7) can be applied with $W_{s,t}$ replaced by $w_s V_{s,t}$ and with $V_{s,t}$ being updated for observed and unobserved targets as per Equations (1) and (2). Some limiting cases employing STEV can be considered.

In a random walk limit, suppose that the state $X_t$ of a specific target s evolves as a random walk:

$$X_t = X_{t-1} + e_t \tag{9}$$

where $e_t$ are independent zero-mean (not necessarily Gaussian) random variables with variance v and that observations are noise free. Then the tracking error evolves as in the following proposition.

Proposition 1: Suppose that the tracking variance $V_t$ of target s evolves as:

$$V_t = \begin{cases} 0 & \text{if } s \text{ is observed at } t \\ V_{t-1} + v & \text{if } s \text{ is not observed at } t \end{cases} \tag{10}$$

for some $v \in \mathbb{R}_+$.

Then the Whittle index $W(V)$ for setup cost $h \in \mathbb{R}_+$, weight $w \in \mathbb{R}_+$ and discount factor $\beta$ is:

$$W(V) = \begin{cases} -h + wv \dfrac{T(1-\beta) - (1-\beta^T)}{(1-\beta)^2} & \text{for } 0 < \beta < 1 \\ -h + \dfrac{wv}{2}(T-1)T & \text{as } \beta \to 1 \end{cases} \tag{11}$$

where $$T := \frac{V}{v} + 1$$

in Equation (11). Given updates $f(\cdot), g(\cdot)$ similar to a random walk, this leads to the heuristic index:

$$\hat{W}(V) := -h + \frac{w}{2v_x}(V - g(V))(f(V) - g(V)) \tag{12}$$

In the limit of large V (useful in settings involving long time intervals between observations where many terms are needed to approximate the sums), if the state $X_t$ and "free" observations $Y_t$ (e.g. payment data) of target s evolve as:

$$X_t : X_{t-1} + N(0, v), Y_t : X_t + N(0, y) \tag{13}$$

where $N(0, x)$ denotes independent normally-distributed random variables with mean zero and variance x, then the tracking error variance for a Kalman filter evolves as in the following proposition.

Proposition 2: suppose that the tracking error variance $V_t$ of target s evolves as:

$$V_t = \begin{cases} 0 & \text{if } s \text{ is observed at } t \\ f(V_{t-1}) & \text{if } s \text{ is not observed at } t \end{cases} \tag{14}$$

where $f(x) := \dfrac{(x+v)y}{x+v+y}$ for some $v \in \mathbb{R}_+$, $y \in \mathbb{R}_+$ and let $f_\infty := \lim_{n \to \infty} f^{(n)}$ be the limit of iterates of $f$. Then for setup cost $h \in \mathbb{R}_+$, weight $w \in \mathbb{R}_+$ and discount factor $\beta = 1$, the Whittle index $W(V)$ satisfies:

$$\lim_{V \uparrow f_\infty} \frac{\hat{W}(V)}{W(V)} = 1 \tag{15}$$

where $$\hat{W}(V) = -h + w \int_0^V \frac{x \, dx}{f(x) - x}$$

It may be remarked that for $r:=\sqrt{v(4y+v)}$ it follows that:

$$\int_0^V \frac{x}{f(x)-x}dx = \left[\frac{vy}{2r}\log\left|\frac{2x+v+r}{2x+v-r}\right| - \frac{y}{2}\log|x^2+vx-vy|-x\right]_0^V \quad (16)$$

As another example, a round robin heuristic can be employed. This heuristic selects an arbitrary order for the targets and given m observing units, at each time t it takes the next m targets according to that order. So if m=2 and n=5 we view the sequence (1,2), (3,4), (5,1), (2,3), . . . targets of pairs of targets. This can be extended to the case in which each mobile unit can view a subset of the targets (e.g., a target collection of the target collections 30), by applying this heuristic to a partition of the targets into target collections.

An embodiment of the operation 74 updating the variance forecasts is next described, which employs Kalman updates. Suppose a target's state $X_t$, mobile unit observations $Y_t$ and payment observations $P_t$ are distributed as follows for some $a_x$, $a_y$, $a_p \in \mathbb{R}$ and for variances $v_x$, $v_y$, $v_p \in \mathbb{R}_+$:

$$X_t : N(a_x X_{t-1}, v_x), Y_t : N(a_y X_t, v_y), P_t : N(a_p X_t, v_p) \quad (17)$$

from which an observation history $H_t := (Z_s; 1 \le s \le t)$ can be constructed where:

$$Z_t = \begin{cases} Y_t & \text{if a mobile unit observation was made at time } t \\ P_t & \text{if only a payment observation was made at time } t \end{cases} \quad (18)$$

If $Y_t$ is observed, the posterior mean $\hat{X}_t := \mathbb{E}[X_t|H_t]$ and variance $V_t := \mathbb{E}[(\hat{X}_t - X_t)^2|H_t]$ satisfy the Kalman updates (see Thiele, *Sur la compensation de quelques erreurs quasi-systematiques par la methode des moindres carres*, C A Reitzel, 1880; Gelb, *Applied optimal estimation*, The MIT Press, 1974):

$$\hat{X}_t = \frac{a_x v_y \hat{X}_{t-1} + a_y U_t Y_t}{a_y^2 U_t + v_y}, \quad (19)$$

$$V_t = \frac{v_y U_t}{a_y^2 U_t + v_y}$$

where $$U_t := a_x^2 V_{t-1} + v_x$$

If $P_t$ is observed, the updates have the same form after replacing $a_y$, $v_y$ by $a_p$, $v_p$.

Further, if it is desired to predict $X_{t+k}$ over some horizon $k \ge 0$ given $H_t$ the updates give:

$$\mathbb{E}[X_{t+k}|H_t] = a_x^k \hat{X}_t, \quad (20)$$

$$\mathbb{E}\left[\left(\hat{X}_{t+k|t} - X_{t+k}\right)^2 \Big| H_t\right] = a_x^{2k} V_t + v_x \sum_{r=0}^{k-1} a_x^{2r}$$

It will be appreciated that the disclosed tracking methods may also be embodied as a non-transitory storage medium storing instructions readable and executable by an electronic data processing device (e.g. the computer 10) to perform an embodiment or embodiments of the disclosed tracking methods. The non-transitory storage medium may, for example, comprise a hard disk or other magnetic storage medium, a read-only memory (ROM), random access memory (RAM), or other electronic storage medium, an optical disk or other optical storage medium, various combinations thereof, or so forth.

While the illustrative example applies to parking occupancy, the disclosed approaches are suitable for tracking various parameters in various contexts, for example tracking people, opinions, bikes, tanks, planes, energy time series, financial time series, states of a robot's joints, or so forth. The targets and target collections are also task-dependent: for example, in opinion tracking, the targets are suitably people whose opinions are to be tracked, and target collections may be defined by available mailing lists, Internet groups, or so forth for particular demographic groups, geographic regions, or so forth. Surveys (corresponding to observing units) can then be sent to specific target collections, i.e. specific mailing lists, Internet groups, or the like, to acquire tracking observations using the first methodology. The second methodology may be a less reliable but higher yield methodology such as mining Internet sites for expressed opinions pertaining to the topic of interest. The observing units can also take various forms, e.g. the illustrative video-based mobile observing units may be replaced by other sensor types such as radar, infrared, pressure, piezoelectric or inductive sensors.

The time segmentation may have different interpretations depending on what is observed, e.g. sets of time instants (every 0.2 seconds) may be considered rather than unions of time intervals (e.g. Mon.-Fri. from 9 AM to 10 AM as is useful in some parking occupancy tracking tasks). The observation cycles for various tracking tasks may range from nanoseconds (e.g. in a network router or microprocessor tracking task) to years (e.g. for survey-based opinion tracking). Further, since the sequence of variances is known in advance for a Kalman filter given what type of observation is made at each time and given the filter's parameters rather than depending on the observations, it is possible to compute the schedule in advance of its application.

The maximum coverage problem can be solved by various alternative methods, such as branch-and-bound methods applied to an integer program formulation using tools like CPLEX, or by applying a variable-neighbourhood search method.

If the optimization objective used to optimize the allocation of observing units involved some function of the variance of target s, say $c_s(V_{s,t})$, then the disclosed update approaches remain applicable for appropriate functions $c_s(\cdot)$. The set of appropriate functions corresponds at least to those functions for which an optimal policy for target s given a constraint on the mean number of observations per unit of discounted time is to observe if and only if the variance exceeds a threshold. This includes a large set of monotonically increasing $C^1$ functions. To extend the method to such functions $c_s(\cdot)$, the Whittle index calculation of Equation (6) is replaced by:

$$W_{s,t} := -h_s + \frac{\sum_{n=0}^{\infty} \beta^n (c_s(\pi_s^{(n)}(f_s(V_{s,t}))) - c_s(\pi_s^{(n)}(g_s(V_{s,t}))))}{1 + \sum_{n=0}^{\infty} \beta^n (\alpha_s^{(n)}(g_s(V_{s,t})) - \alpha_s^{(n)}(f_s(V_{s,t})))} \quad (21)$$

While in the illustrative examples the weights $w_s$ are assigned based on a priori known information (e.g. parking fee, number of spaces in a parking space segment), it is alternatively contemplated to heuristically adapt the weightings for each iteration of the Whittle indices computation 70. In applications directed to policy change, accurate estimates are of most value when the true occupancy lies near to policy decision boundaries e.g. for occupancy fractions of 40% to 90% in some parking occupancy tracking applications. For parking guidance, which may be based on historical data rather than real-time data, it is desired to assist drivers in minimizing the travel distance to a vacant stall, and so more accuracy for high occupancies, e.g. over 90%, is of most value, as these correspond to larger travel distances. For guided enforcement, which may also be based on historical data rather than real-time data, the fraction of unpaid occupancy is of interest, which means that very low occupancies e.g. under 40%, are of less interest. For retrospective policy evaluation, cities are often interested in solving the biggest problems of under-use and congestion. For these tasks more accurate estimates for high and low occupancies e.g. over 90% or under 40%, are of most interest. For each of these specific tasks, the weightings $w_s$ can be heuristically adapted for each iteration of the Whittle indices computation 70 to give higher weight to parking space segments whose occupancies are in the regions of interest.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A non-transitory storage medium storing instructions readable and executable by an electronic data processing device to perform a tracking method comprising iteratively repeating the set of operations:
    applying a first methodology (O) to acquire observations of a parking occupancy metric for a selected sub-set of a set of parking space segments wherein the parking occupancy metric represents the fraction of occupied parking spots in the selected sub-set of parking space segments, wherein the parking space segments are grouped into parking space segment collections each observable by a single mobile observing unit of a set of mobile observing units, the first methodology computing the parking occupancy metric based on observations acquired for the selected sub-set of the set of parking space segments by the set of mobile observing units;
    applying a second methodology (P) different from the first methodology and that does not use observing units to acquire observations of the parking occupancy metric for at least those parking space segments of the set of parking space segments that are not in the selected sub-set of the set of parking space segments, the second methodology estimating the parking occupancy metric based on collected parking payments;
    generating variance forecasts for each parking space segment of the set of parking space segments using:
        a variance update function (g) operating on observations of the parking occupancy metric acquired using the first methodology (O) that is used when the parking space segment is in the selected sub-set of the set of parking space segments; and
        a variance update function (f) operating on observations of the parking occupancy metric acquired using the second methodology (P) that is used when the parking space segment is not in the selected sub-set of the set of parking space segments; and
    updating the selected sub-set of the set of parking space segments for an upcoming time interval, and re-allocating the mobile observing units of the set of mobile observing units by moving mobile observing units of the set of mobile observing units to positions observing the updated sub-set of the set of parking space segments for the upcoming time interval to maximize the aggregation of variance forecasts over the set of parking space segments observable by the re-allocation of the mobile observing units.

2. The non-transitory storage medium of claim 1 wherein the aggregation of variance forecasts over the set of parking space segments observable by the allocation of the mobile observing units comprises a sum of Whittle indices computed for the parking space segments observable by the allocation of the mobile observing units.

3. The non-transitory storage medium of claim 1 wherein generating a variance forecast for each parking space segment of the set of parking space segments comprises:
    modeling the observations of the parking occupancy metric acquired by applying the first methodology (O) using a statistical distribution having a variance $v_y$;
    modeling the observations of the parking occupancy metric acquired by applying the second methodology (P) using a statistical distribution having a variance $v_p$; and
    generating the variance forecast for each parking space segment using either:
        the variance update function (g) operating on the variance for the parking space segment and on the modeled variance $v_y$;
        the variance update function (f) operating on the variance for the parking space segment and on the modeled variance $v_p$.

4. The non-transitory storage medium of claim 3 wherein the variance update functions (g) and (f) are Kalman update functions.

5. The non-transitory storage medium of claim 1 wherein the optimizing at time t comprises optimizing an objective $$\max_{\mathcal{M} \to \mathcal{C}} \sum_{s \in \mathcal{A}_t} W_{s,t}$$

where $\mathcal{M}$ denotes the set of mobile observing units, $\mathcal{C}$ denotes the set of parking space collections, $\mathcal{M} \to \mathcal{C}$ denotes an allocation of the mobile observing units of the set of mobile observing units $\mathcal{M}$ to collections of the set of parking space segment collections $\mathcal{C}$, $\mathcal{A}_t$ denotes the sub-set of the set of spatially distributed parking space segments that are observable by the allocation $\mathcal{M} \to \mathcal{C}$, and $W_{s,t}$ denotes an index that depends on the variance forecast for parking space segment s over an upcoming time interval.

6. The non-transitory storage medium of claim 5 wherein the indices $W_{s,t}$ are Whittle indices.

7. A tracking method for monitoring a parking occupancy metric for a set of parking space segments, the tracking method comprising:
    applying a first methodology during a current time interval to acquire observations of the parking occupancy metric for a selected sub-set of the set of parking space segments using a set of mobile observing units allocated to observe the selected sub-set of the set of parking space segments, wherein the parking occupancy metric represents the fraction of occupied parking spots in the selected sub-set of parking space segments;

applying a second methodology that does not use observing units and is different from the first methodology during the current time interval to acquire observations of the parking occupancy metric for at least those parking space segments that are not in the selected sub-set of the set of parking space segments;

generating variance forecasts for an upcoming time interval for each parking space segment using a computer configured to compute either:

a variance update function operating on a current variance for the parking space segment and on observations acquired for the parking space segment in the current time interval using the first methodology that is used when the parking space segment is in the selected sub-set of the set of parking space segments; and a variance update function operating on the current variance for the parking space segment and on observations acquired for the parking space segment in the current time interval using the second methodology that is used when the parking space segment is not in the selected sub-set of the set of parking space segments;

using the computer, updating the selected sub-set of the set of parking space segments for the upcoming time interval to maximize an aggregation of variance forecasts over the updated selected sub-set of the set of parking space segments; and after updating the selected sub-set of the set of parking space segments for the upcoming time interval, re-allocating the mobile observing units of the set of mobile observing units to observe the updated sub-set of the set of parking space segments for the upcoming time interval by moving mobile observing units of the set of mobile observing units to positions observing the updated sub-set of the set of parking space segments for the upcoming time interval.

8. The tracking method of claim 7 wherein the parking space segments of the set of parking space segments are grouped into parking space segment collections, each parking space segment collection being observable by a single mobile observing unit of the set of mobile observing units, and the updating of the selected sub-set of the set of parking space segments comprises:

optimizing an allocation of the mobile observing units to the parking space segment collections to maximize an aggregation of variance forecasts over the mobile parking space segments observable by the allocation of the mobile observing units.

9. The tracking method of claim 8 wherein the aggregation of variance forecasts over the parking space segments observable by the allocation of the mobile observing units comprises an aggregation of Whittle indices computed for the parking space segments observable by the allocation of the mobile observing units.

10. A system for monitoring a parking occupancy metric for a set of spatially distributed parking space segments grouped into parking space segment collections of a set of parking space segment collections $\mathcal{C}$, the system comprising:

a first observation system comprising a set of mobile observing units $\mathcal{M}$ arranged to acquire observations of the parking occupancy metric for a selected sub-set of the set of spatially distributed parking space segments in which the parking occupancy metric represents the fraction of occupied parking spots in the selected sub-set of parking space segments, where each parking space segment collection of the set of parking space collections $\mathcal{C}$ is observable by a single mobile observing unit and the selected sub-set is defined by an allocation $\mathcal{M} \to \mathcal{C}$ of the mobile observing units set of the mobile observing units $\mathcal{M}$ to parking space segment collections of the set of parking space collections $\mathcal{C}$;

a second observation system configured to acquire observations of the parking occupancy metric without using observing units for at least those parking space segments of the set of spatially distributed parking space segments that are not in the selected sub-set of the set of spatially distributed parking space segments; and a computer configured to generate variance forecasts for each parking space segment of the set of spatially distributed parking space segments by computing:

for parking space segments belonging to the selected sub-set of the set of spatially distributed parking space segments, a variance update function operating on a current variance for the parking space segment and on observations acquired for the parking space segment using the first observation system, and for parking space segments of the set of spatially distributed parking space segments that do not belong to the selected sub-set of the set of spatially distributed parking space segments, a variance update function operating on the current variance for the parking space segment and on observations acquired for the parking space segment using the second observation system;

and further configured to update the selected sub-set of the set of spatially distributed parking space segments for an upcoming time interval, and re-allocating the mobile observing units of the set of mobile observing units by moving mobile observing units of the set of mobile observing units to positions observing the updated sub-set of the set of parking space segments for the upcoming time interval to maximize an aggregation of variance forecasts over the updated selected sub-set of the set of spatially distributed parking space segments.

11. The system of claim 10 wherein the computer is configured to update the selected sub-set of the set of spatially distributed parking space segments at a time t to optimize the objective $$\max_{M \to C} \sum_{s \in \mathcal{A}_t} W_{s,t}$$

where $\mathcal{A}_t$ denotes the sub-set of the set of spatially distributed parking space segments that are observable by the allocation $\mathcal{M} \to \mathcal{C}$, and $W_{s,t}$ denotes an index that depends on the variance forecast for parking space segment s over an upcoming time interval.

12. The system of claim 11 wherein the indices $W_{s,t}$ are Whittle indices.

13. The system of claim 11 wherein:

the variance update function operating on a current variance for the parking space segment and on observations acquired for the parking space segment using the first observation system is a Kalman update function; and the variance update function operating on the current variance for the parking space segment and on observations acquired for the parking space segment using the second observation system is a Kalman update function.

14. The system of claim 11 wherein:

the mobile observing units comprise mobile camera units configured to detect occupancy of parking spaces in a parking space segment viewed by a camera of the mobile camera unit; and the mobile camera unit is located adjacent to a parking space segment and is mounted at an elevation position and arranged to rotate such that the parking space segment is viewed by the mobile camera.

* * * * *